(12) United States Patent
Huang

(10) Patent No.: US 11,084,743 B2
(45) Date of Patent: *Aug. 10, 2021

(54) METHOD FOR REMOVAL OF RECALCITRANT SELENIUM SPECIES FROM WASTEWATER

(71) Applicant: The Texas A&M University System, College Station, TX (US)

(72) Inventor: Yongheng Huang, College Station, TX (US)

(73) Assignee: Texas A&M University System, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/769,289

(22) PCT Filed: Oct. 20, 2016

(86) PCT No.: PCT/US2016/057916
§ 371 (c)(1),
(2) Date: Apr. 18, 2018

(87) PCT Pub. No.: WO2017/070347
PCT Pub. Date: Apr. 27, 2017

(65) Prior Publication Data
US 2018/0305229 A1    Oct. 25, 2018

Related U.S. Application Data

(60) Provisional application No. 62/244,613, filed on Oct. 21, 2015.

(51) Int. Cl.
*C02F 1/70* (2006.01)
*C02F 1/72* (2006.01)
(Continued)

(52) U.S. Cl.
CPC ............... *C02F 1/705* (2013.01); *C02F 1/72* (2013.01); *C02F 2101/106* (2013.01);
(Continued)

(58) Field of Classification Search
CPC .. C02F 1/705; C02F 1/72; C02F 1/722; C02F 1/76; C02F 2101/106; C02F 2101/18;
(Continued)

(56) References Cited

U.S. PATENT DOCUMENTS 5,071,568 A * 12/1991 Bennett ................... C02F 1/76
210/721
2005/0016928 A1    1/2005 Meng et al.
(Continued)

FOREIGN PATENT DOCUMENTS

CN    102173524 B    7/2012
JP    5211320 B2    3/2013
WO    99/20569 A1    4/1999

OTHER PUBLICATIONS

International Preliminary Report on Patentability dated Apr. 24, 2018, issued in corresponding International Application No. PCT/US2016/057916, filed Oct. 20, 2016, 8 pages.
(Continued)

*Primary Examiner* — Lucas A Stelling
(74) *Attorney, Agent, or Firm* — Christensen O'Connor Johnson Kindness PLLC

(57) ABSTRACT

Methods and systems for reducing the concentration of selenium species in water, particularly water containing recalcitrant selenium species. In the methods and systems, water containing one or more selenium species is treated with permanganate to provide permanganate-treated water, which is then contacted with a zero-valent iron treatment system comprising (a) a reactive solid comprising zero-
(Continued)

valent iron and one or more iron oxide minerals in contact therewith and (b) ferrous iron.

19 Claims, 4 Drawing Sheets

(51) Int. Cl.
| | |
|---|---|
| C02F 101/10 | (2006.01) |
| C02F 103/10 | (2006.01) |
| C02F 101/20 | (2006.01) |
| C02F 103/36 | (2006.01) |
| C02F 103/06 | (2006.01) |
| C02F 101/18 | (2006.01) |
| C02F 103/18 | (2006.01) |

(52) U.S. Cl.
CPC ...... *C02F 2101/18* (2013.01); *C02F 2101/20* (2013.01); *C02F 2103/06* (2013.01); *C02F 2103/10* (2013.01); *C02F 2103/18* (2013.01); *C02F 2103/365* (2013.01)

(58) Field of Classification Search
CPC .............. C02F 2101/20; C02F 2101/36; C02F 2103/06; C02F 2103/10; C02F 2103/18; C02F 2103/365
See application file for complete search history.

(56) References Cited

U.S. PATENT DOCUMENTS

| | | |
|---|---|---|
| 2011/0174743 A1* | 7/2011 | Huang .................... C02F 1/705 |
| | | 210/758 |
| 2011/0220583 A1 | 9/2011 | Schwartz et al. |
| 2012/0241381 A1 | 9/2012 | Bruso |
| 2012/0273431 A1 | 11/2012 | Huang |
| 2014/0374104 A1 | 12/2014 | Seth |

OTHER PUBLICATIONS

International Search Report and Written Opinion dated Jan. 17, 2017, issued in corresponding International Application No. PCT/US2016/057916, filed Oct. 20, 2016, 9 pages.

Extended European Search Report dated Mar. 1, 2019, issued in corresponding European Application No. 16858215.3, filed Oct. 20, 2016, 9 pages.

Huang, Y.H., et al., "Hybrid Zero-Valent Iron Process for Removing Heavy Metals and Nitrate From Flue-Gas-Desulfurization Wastewater," Separation and Purification Technology 118:690-698, Oct. 2013.

Yang, Z., "Removal of Selenium From Wastewater Using ZVI and Hybrid ZVI/Iron Oxide Process," Master's Thesis, Texas A&M University, College Station, Texas, Dec. 2012, 63 pages.

\* cited by examiner

METHOD FOR REMOVAL OF RECALCITRANT SELENIUM SPECIES FROM WASTEWATER

CROSS-REFERENCE TO RELATED APPLICATION

This application claims the benefit of U.S. Provisional Application No. 62/244,613, filed Oct. 21, 2015, which application is incorporated herein by reference in its entirety.

FIELD OF THE INVENTION

The present invention relates to improved methods for removing selenium species from wastewater, particularly removing recalcitrant selenium species using a hybrid zero-valent iron system that includes an oxidation pretreatment stage.

BACKGROUND OF THE INVENTION

Selenium is present in a variety of industry wastewaters and is increasingly recognized as a pollutant of significant concern. In recent years, both federal and local environmental regulatory bodies have moved towards imposing strict limits for selenium concentrations in industrial effluent discharges. In industrial wastewaters, selenium may be present in various forms. Selenium oxyanions, such as selenate ($SeO_4^{2-}$) and selenite ($SeO_3^{2-}$) are more commonly found in coal-fired power plant and mining wastestreams, and reduced forms, such as selenocyanate ($SeCN^-$), are often present in the sour-stripped water from the oil refining process.

Removing selenium from wastewater represents a challenge and a mandate to the water industry. In 2013, the US Environmental Protection Agency proposed a limit of 10 ppb (μg/L) for selenium monthly average for the thermoelectric power industry. Some local and state authorities have enacted even lower limits for certain wastewater effluents (e.g., 4.7 ppb for total selenium imposed in mining and refinery wastewater in some states). To comply with such strict limits, industries must often achieve over 99% removal efficiency.

In view of the requirement for compliance to regulations for effluent discharge limits, many power plants have installed wet flue gas desulfurization (FGD) systems to control sulfur dioxide emissions. In addition to sulfur dioxide, wet FGD systems also capture volatile trace elements including selenium and these FGD wastewaters can contain dissolved selenium in concentrations ranging from less than 10 ppb to several thousand ppb.

Selenium exists in a variety of forms and oxidation states. Organic selenium species present in the environment include selenide ($Se^{-2}$), elemental selenium ($Se^0$), selenite ($Se^{4+}$), and selenate ($Se^{6+}$). Elemental selenium ($Se^0$) and selenides ($Se^{-2}$) exist in reducing zones and unweathered mineral formations, and are relatively immobile because of the low solubility of their solid phases. Selenite ($Se^{4+}$) and selenate ($Se^{6+}$) are the most mobile forms of selenium and their primary species at neutral conditions are $HSeO_3^-$ and $SeO_4^{2-}$, respectively. In many selenium-contaminated wastewaters, selenium exists in a few common forms including selenate, selenite, selenocyanate, and methylselenic acid.

Several chemical and biological methods have been demonstrated to be effective for removing these selenium compounds in wastewater to a very low concentration level. However, in certain wastewaters, selenium has been found to exist in unidentified forms that are difficult to remove by established selenium treatment methods.

Selenium chemistry in the FGD wastewater is complex due to transformations between selenium species and the presence of unidentified selenium species that are resistant to removal.

While certain zero-valent iron technologies (e.g., hybrid zero-valent iron) have been shown to efficiently reduce the concentrations of identifiable organic and inorganic selenium species, such as selenate, selenite, methylselenic acid, selenomethionine, and selenocyanate, in wastewater to low or sub ppb levels (<10 ppb), removal of unidentified selenium species that are resistant to removal remains a challenge.

To date, treatment methods have been less effective in achieving low selenium concentrations for wastewaters that include unidentified selenium species that are resistant to removal. The presence of such selenium species is an obstacle for industries where regulations are forcing compliance with ever-more stringent effluent discharge limits for selenium.

A need exists for improved methods for removing or reducing the concentration of selenium in industrial wastewaters, particularly wastewaters that include selenium species that have been previously resistant to removal. The present invention seeks to fulfill this need and provides further related advantages.

SUMMARY OF THE INVENTION

In one aspect, the invention provides a method for reducing the concentration of selenium species in water. In one embodiment, the method comprises:

treating water comprising one or more selenium species with permanganate to provide permanganate-treated water; and contacting the permanganate-treated water with a zero-valent iron treatment system comprising (a) a reactive solid comprising zero-valent iron and one or more iron oxide minerals in contact therewith and (b) ferrous iron, whereby the concentration of selenium in the permanganate-treated water is reduced by the action of the zero-valent iron system on the selenium species.

In another aspect, the invention provides a system for reducing the concentration of selenium species in water. In one embodiment, the system comprises:

a first vessel for receiving water comprising one or more selenium species, wherein the first vessel comprises aqueous permanganate; and a first reactor in fluid communication with the first vessel for receiving permanganate-treated water from the first vessel, wherein the first reactor comprises a zero-valent iron treatment system comprising (a) a reactive solid comprising zero-valent iron and one or more iron oxide minerals in contact therewith and (b) ferrous iron.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

Figure 1:
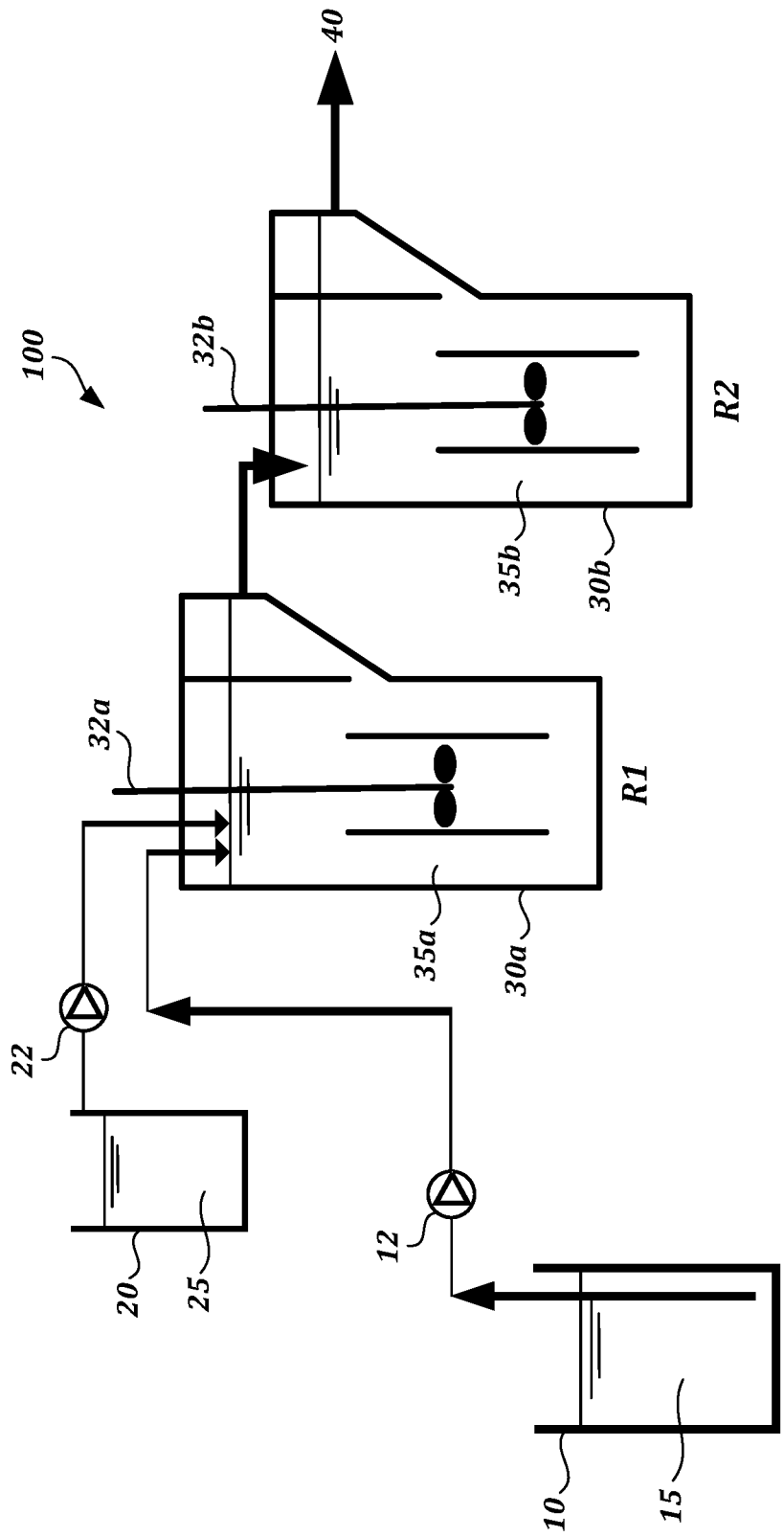
FIG. 1 is a schematic illustration of a representative two-stage hybrid zero-valent iron (hZVI or activated iron) treatment system: permanganate oxidation pre-treatment (OX PT); first stage zero-valent iron reduction (R1); and second stage zero-valent iron reduction (R2).

The present invention provides methods and systems for reducing the concentration of selenium species in water, particularly water containing recalcitrant selenium species. In the methods and systems, water containing one or more selenium species is treated with permanganate to provide permanganate-treated water, which is then contacted with a zero-valent iron treatment system comprising (a) a reactive solid comprising zero-valent iron and one or more iron oxide minerals in contact therewith and (b) ferrous iron.

In the methods of the invention, permanganate oxidation occurs prior to the zero-valent iron treatment (e.g., first stage of a multiple stage zero-valent iron treatment). In certain embodiments, permanganate is added to the wastewater feed tank to mix with raw wastewater and oxidize (or destroy) the recalcitrant selenium species to provide selenium species treatable by the zero-valent iron system.

Methods for Reducing the Concentration of Selenium Species

In one aspect, the invention provides a method for reducing the concentration of selenium species in water. In one embodiment, the method for reducing the concentration of selenium species in water, comprises:

treating water comprising one or more selenium species with permanganate to provide permanganate-treated water; and contacting the permanganate-treated water with a zero-valent iron treatment system comprising (a) a reactive solid comprising zero-valent iron and one or more iron oxide minerals in contact therewith and (b) ferrous iron, whereby the concentration of selenium in the permanganate-treated water is reduced by the action of the zero-valent iron system on the selenium species.

The method of the invention is effective in reducing the concentration of selenium species in water, particularly effective in reducing the concentration of recalcitrant selenium species in water. As used herein, the term "recalcitrant selenium species" refers to selenium species found in selenium-containing wastewaters that are at present in unidentified forms and that are difficult to remove or to have their concentrations reduced by established selenium treatment methods, including hybrid zero-valent iron treatment methods (e.g., Activated Iron Process).

Unless otherwise stated, selenium concentrations (ppb or g/L) are total selenium concentrations as determined by inductively coupled plasma dynamic reaction cell mass spectrometry (ICP-DRC-MS).

Selenium speciation was determined by ion chromatography inductively coupled plasma collision reaction cell mass spectrometry (IC-ICP-CRC-MS).

In certain embodiments, the concentration of permanganate useful in the method is from about 1 to about 100 mg/L. In certain embodiments, the concentration of permanganate is from about 10 to about 50 mg/L. In certain embodiments, the concentration of permanganate is about 10 mg/L.

The source of permanganate is not critical. In certain embodiments, the permanganate is potassium permanganate. Other permanganate salts are effective.

A variety of selenium species are effectively treated by the method of the invention. Selenium species that are effectively treated include selenate ($Se^{6+}$), selenite ($Se^{4+}$), and selenide ($Se^{-2}$) species, as well as mixtures thereof. Representative selenium species that are effectively treated include selenates, selenites, selenocyanates, selenomethionines, and methylselenic acids. As noted above, the method of the invention is particularly effective in treating (i.e., reducing the concentration of) recalcitrant selenium species.

In certain embodiments of the method, treating water comprises contacting one or more selenium species with permanganate to provide permanganate-treated water occurs in a first vessel (e.g., contact mixing tank). In this embodiment, the concentration of permanganate in the first vessel is maintained at about 5 to about 100 mg/L. In certain embodiments, contacting the permanganate-treated water with a zero-valent iron treatment system occurs in a first reactor. In these embodiments, the first reactor is a packed bed or a fluidized bed. In certain embodiments, the ferrous iron of the zero-valent iron treatment system is continuously introduced to the first reactor.

It will be appreciated that the methods of the invention can include more than one zero-valent iron reactor (e.g., multi-stage zero-valent iron reactors include in two, three, four, five, six, seven, or eight zero-valent iron reactors).

In certain embodiments, the method does not include introducing air or oxygen (aeration) to the water containing the selenium species either in the permanganate treatment step or the zero-valent iron treatment step.

The present invention provides an improved method for reducing the concentration of selenium species in water involving contacting the water containing the one or more selenium species with a zero-valent iron treatment system comprising (a) a reactive solid comprising zero-valent iron and one or more iron oxide minerals in contact therewith, and (b) ferrous iron, the improvement comprising treating the water comprising one or more selenium species with permanganate prior to contacting the water with the hybrid zero-valent iron treatment system.

It will be appreciated that the permanganate treatment step of the method of the invention can be effectively coupled with any treatment system that is effective for removing or reducing the concentration of contaminants. The permanganate treatment step can be combined with treatment systems other than zero-valent iron treatment systems and with zero-valent iron treatment systems that are not hybrid zero-valent iron systems (i.e., zero-valent iron systems that utilize zero-valent iron alone without the use of ferrous iron to maintain the activity of the zero-valent iron).

Zero-Valent Iron Treatment System.

The methods of the invention utilize a zero-valent iron treatment system ($Fe(0)/FeO_x/Fe^{2+}$) for reducing the concentration of the selenium species. In the method, water containing one or more selenium species is treated with permanganate to provide permanganate-treated water, which is then contacted with a zero-valent iron treatment system comprising (a) a reactive solid comprising zero-valent iron and one or more iron oxide minerals in contact therewith and (b) ferrous iron. In certain embodiments, the one or more iron oxide minerals of the reactive solid comprise magnetite. In certain embodiments, the reactive solid comprises a plurality of particles.

Zero-valent iron treatment systems that utilize ZVI composites to reduce the concentration of a variety contaminants are useful in the methods of the invention and include those described in US 2011/0174743 and US 2012/0273431, each expressly incorporated by reference in its entirety. In these zero-valent iron treatment systems, also known as hybrid zero-valent iron (hZVI) treatment systems, a zero-valent iron [Fe(0)/FeO$_x$/Fe$^{2+}$] composite (also referred to as a hybrid zero-valent iron composite or hybrid ZVI composite) includes a reactive solid [zero valent iron (Fe(0) or ZVI) and iron oxide (FeO$_x$)] and a secondary reagent [ferrous iron, (Fe(II), or Fe$^{2+}$)]. In the methods, the reactive solid is effective for removing and/or reducing the concentration of contaminants in a fluid. In certain embodiments, the composite is a particle having a core comprising zero-valent iron and a layer associated with the core that includes the reactive material.

In zero-valent iron treatment systems, the zero-valent iron serves as a reductant that is effective to reduce the contaminant species such that the reducible contaminant species is removed from solution and converted into a solid, thereby effectively reducing the concentration of the contaminant in solution (e.g., contaminated water). The ferrous iron of the system serves to maintain the activity of the zero-valent iron component of the system.

An advantage of the hybrid ZVI composite and system is the sustainability of a high level of activity and improved lifetime, particularly in comparison to compositions or systems that include zero-valent iron alone (i.e., without supplemental ferrous iron).

The reactive composite can be produced by an activation process. The activation process may involve oxidizing at least a portion of a zero-valent iron so as to form an iron oxide and exposing the iron oxide to dissolved ferrous ion to form the reactive material. The ferrous ion may adsorb onto and become a part of the composite. The reactive composite may be produced in situ as part of a contaminant removal process.

Treatable Contaminated Fluids.

A variety of selenium-containing waters may be treated according to the methods of the invention. Representative treatable waters include flue gas desulfurization wastewater, industrial waste streams, oil refinery waste, tail water of a mining operation, stripped sour water, surface water, ground water, and an influent stream. Industrial waste streams include streams of various industrial processes. An industrial waste stream treatable by the method of the invention can be produced at any stage of an industrial process. In one embodiment, the water is a flue gas desulfurization (FGD) wastewater. In one embodiment, the water is oil refinery waste. In one embodiment, the water is tail water of a mining operation. In one embodiment, the water is stripped sour water.

Contaminants and Contaminant Removal.

In addition to reducing the concentration of selenium, the methods of the invention are effective for reducing the concentration of other contaminants whose concentration can be reduced by zero-valent iron system treatment.

Contaminants that can be removed or their concentration reduced include metal compounds, metal ions, metal oxides, metalloids, oxyanions, chlorinated organic compounds, and combinations thereof.

Examples of contaminants treatable by the methods of the invention include toxic materials, such as toxic metals. Non-limiting examples of toxic metals include arsenic, aluminum, antimony, beryllium, mercury, cobalt, lead, cadmium, chromium, silver, zinc, nickel, molybdenum, thallium, vanadium, and the like, ions thereof, and compounds thereof.

Treatable contaminants can include metalloid contaminants, such as boron and ions thereof; oxyanions, such borates, nitrates, bromates, iodates, and periodates; and chlorinated organic compounds.

Waters treatable by the methods of the invention can include mixtures of the contaminants noted above.

Representative contaminants that can be removed or their concentration reduced include arsenic compounds, aluminum compounds, antimony compounds, beryllium compounds, mercury compounds, cobalt compounds, lead compounds, cadmium compounds, chromium compounds, silver compounds, zinc compounds, nickel compounds, molybdenum compounds, thallium compounds, vanadium compounds, arsenic ion, aluminum ion, antimony ion, beryllium ion, mercury ion, selenium ion, cobalt ion, lead ion, cadmium ion, chromium ion, silver ion, zinc ion, nickel ion, molybdenum ion, thallium ion, vanadium ion, borates, nitrates, bromates, iodates, periodates, trichloroethylene, dissolved silica, and combinations thereof.

Systems for Reducing the Concentration of Selenium Species

In another aspect, the invention provides systems for reducing the concentration of one or more selenium species in water. In one embodiment, the system comprises:

a first vessel for receiving water comprising one or more selenium species, wherein the first vessel comprises aqueous permanganate; and a first reactor in fluid communication with the first vessel for receiving permanganate-treated water from the first vessel, wherein the first reactor comprises a zero-valent iron treatment system comprising (a) a reactive solid comprising zero-valent iron and one or more iron oxide minerals in contact therewith and (b) ferrous iron.

Exemplary zero-valent iron treatment systems useful in the methods of the invention include those described in US 2011/01747443 and US 2012/027343, each expressly incorporated herein by reference in its entirety. Single-stage and multiple-stage reactor systems can be used.

In some embodiments, the system is a single-stage reactor system and includes a single reactor (e.g., a fluidized bed reactor). In other embodiments, the system is a multiple-stage reactor system and includes two or more reactors. The systems may further include one or more of the following: an internal solid/liquid separating zone (e.g., settling zone), an aerating basin, a settling basin, and a filtration bed.

FIG. 1 is a schematic illustration of a representative two-stage hybrid zero-valent iron (hZVI or activated iron) treatment system: permanganate oxidation pre-treatment (OX PT); first stage zero-valent iron reduction (R1); and second stage zero-valent iron reduction (R2). Referring to FIG. 1, system 100 includes oxidation pre-treatment (OX PT) vessel 10 comprising aqueous permanganate (e.g., permanganate in raw wastewater) which provides oxidant-treated wastewater 15; first hZVI reactor R1 (30a); and second hZVI reactor R2 (30b). Ferrous iron solution 25 is delivered from vessel 20 to first reactor 30a (R1) via pump 22. Oxidant-treated wastewater 15 is delivered to first reactor 30a via pump 12. First reactor 30a includes first stage ZVI-treated water 35a, which is conducted to second reactor 30b (R1) to provide second stage ZVI-treated water 35b. Each of the first and second reactors includes a stirrer (32a and 32b, respectively). Treated effluent 40 is conducted from second reactor 30b.

Representative Embodiments

Pilot tests conducted at a Southern Company Inc. power plant (Atlanta, Ga.) on FGD wastewater demonstrated that although a hybrid zero-valent iron (hZVI) system was effective in decreasing concentrations of selenate, selenite, selenocyanate, and other currently identifiable organoselenium compounds to low ppb level (<5 ppb), certain unidentified selenium species were very difficult to decrease to below 10 ppb. In the FGD wastewater, unidentified selenium species at a concentration of 200-700 ppb accounted for about 20% of the total selenium. During the testing, the unidentified selenium species was generally decreased from a level of a few hundred ppb in the feed to about 50 ppb in the treated effluent after treatment with 4-stage hZVI reactor having a 17 hr reaction time. The 17 h result, while not so impressive when compared with the removal of more common selenium species (e.g., selenate, selenite, selenocyanate) by the hZVI system, indicate that the hZVI system can slowly remove these unidentified selenium species to a significant degree. Because the FGD wastewater was found to contain a substantial concentration of organic carbon (TOC=22 mg/L), it was postulated that the unidentified selenium species may be related to organic material in the wastewater.

To test the hypothesis, laboratory batch and continuous flow stirred-tank reactor (CSTR) tests were conducted to evaluate the effectiveness of the hZVI system in removing or reducing the concentration of these unidentified selenium species present in the FGD wastewater, and to evaluate modifications of the hZVI system to improve the effectiveness of removal of the unidentified selenium species.

As a result of these studies, a chemical method was developed that utilizes a strong oxidant, permanganate, to pretreat wastewater contaminated with these unidentified selenium species. After the oxidation pretreatment, the hZVI system was used to treat the permanganate-pretreated wastewater to provide wastewater effluents in which the selenium concentration was reduced to less than 10 ppb (µg/L). For these wastewaters, without permanganate pretreatment, the hZVI system provided wastewater effluents having total selenium concentration of about 50 ppb.

Without being bound to theory, two mechanisms may be involved in the permanganate pretreatment: (1) the unidentified selenium species may be directly oxidized by permanganate into selenate; or (2) if unidentified selenium species existed as part of a greater organic structure (e.g., a protein structure), permanganate treatment may participate in the breakdown of the greater organic structure to smaller structures that can be effectively treated by the hZVI system or a biological method.

The permanganate pretreatment is not designed to remove selenium or reduce selenium concentration. Rather, permanganate pretreatment is effective to transform certain unidentified selenium species to selenium species treatable by established selenium-removal systems and methods (e.g., hZVI). The present invention therefore provides a system and method for improving the treatability of selenium-containing wastewaters, particularly selenium-containing wastewaters that include unidentified selenium species, in subsequent wastewater treatments.

Oxidation of FGD Wastewater

Samples of FGD wastewater were treated with select oxidants (i.e., hydrogen peroxide ($H_2O_2$), potassium permanganate ($KMnO_4$), hypochlorite ($OCl^-$), and persulfate ($S_2O_8^{2-}$) at 50 mg/L) to determine the effectiveness of oxidants to transform the unidentified selenium species to identifiable species and to evaluate selenium speciation. See Example 1.

Selenium speciation results indicate that selenium in the tested FGD wastewater existed in various species and oxidation states, and that the total selenium concentration in the FGD wastewater was about 1788 ppb by IC-ICP-CRC-MS method. Table 1 summarizes selenium speciation change in FGD wastewater after treatment with select oxidants (hydrogen peroxide, potassium permanganate, hypochlorite ($OCl^-$), and persulfate ($S_2O_8^{2-}$).

TABLE 1

Change of Se speciation in the FGD wastewater after treatment with selected oxidants.

| | | | Se speciation analyses (IC-ICP-CRC-MS) | | | | | | |
|---|---|---|---|---|---|---|---|---|---|
| Samples | pH | Se(IV) | Se(VI) | SeCN⁻ | MeSe(IV) | SeMe | $SeSO_3^{2-}$ | Unknown Se Species (n) | Total Se |
| Raw FGD | 7.54 | | 371 | ND[1] | 5.03 | ND[2] | ND[2] | 52.6 (1) | 1788.63 |
| Pretreated with $H_2O_2$ | 7.37 | 1410 | 384 | ND[1] | 11.1 | ND[2] | ND[2] | 54.9 (1) | 1860.00 |
| Pretreated with $KMnO_4$ | 7.31 | 1.58 | 1690 | ND[1] | 21.2 | ND[2] | ND[2] | 35 (1) | 1747.78 |
| Pretreated with $OCl^-$ | 7.77 | 2.26 | 1760 | ND[1] | 11.2 | ND[2] | ND[2] | 57.9 (1) | 1831.36 |
| Pretreated with $S_2O_8^{2-}$ | 7.03 | 1280 | 505 | 0.79 | 10.4 | ND[2] | ND[2] | 53.9 (1) | 1850.09 |

All results reflect the applied dilution and are reported in µg/L.
ND[1] = Not detected at the applied dilution (<0.35).
ND[2] = Not detected at the applied dilution (<0.30).
SeCN = Selenocyanate; MeSe(IV) = Methylseleninic acid; SeMe = Selenomethionin; $SeSO_3^{2-}$ = Selenosulfate.
Unknown Se Species = Total concentration of all unknown Se species observed by IC-ICP-Ms.
n = number of unknown Se species observed.

Figure 2:
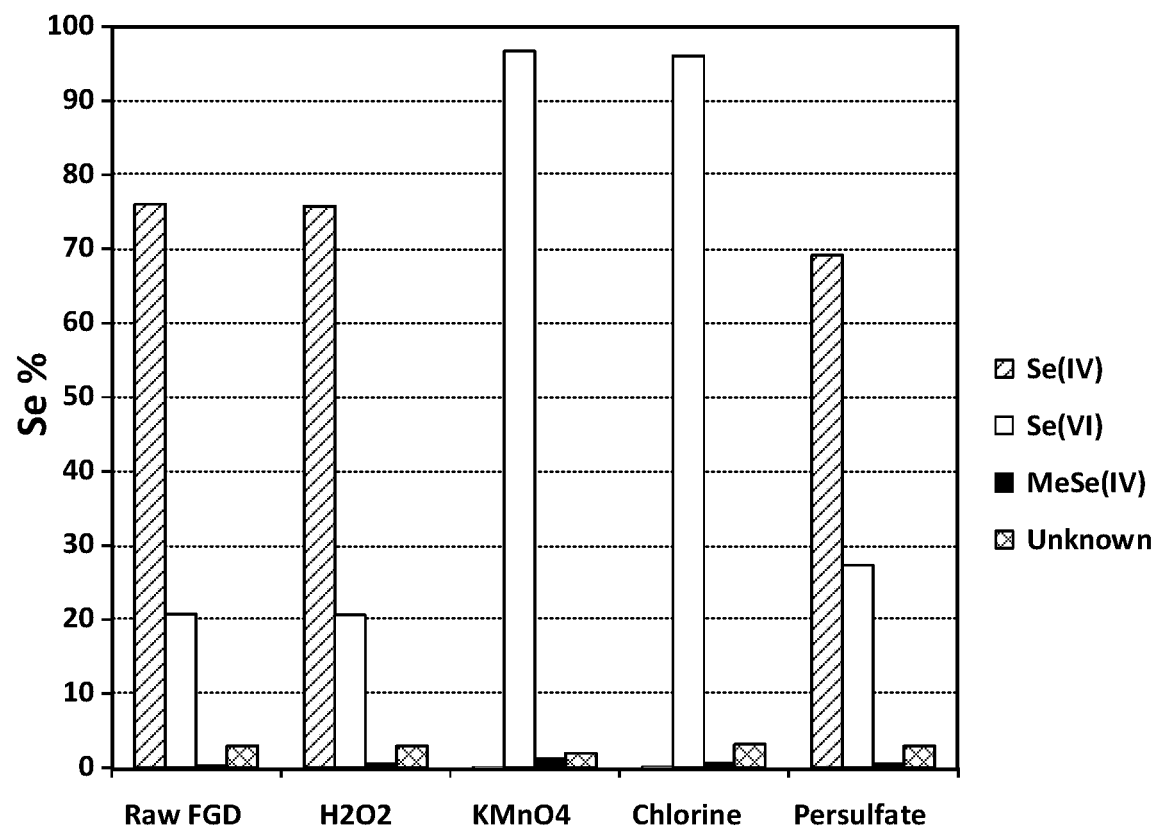
FIG. 2 compares selenium species distribution [Se(IV), Se(VI), MeSe(IV), and unidentified Se (unknown Se)] in FGD wastewater as percent total selenium of untreated (raw) and pre-treated by select oxidants (hydrogen peroxide ($H_2O_2$), potassium permanganate ($KMnO_4$), chlorine (hypochlorite), persulfate).

As shown in FIG. 2, selenite in raw FGD wastewater accounted for 76% of the selenium and was the dominant species, while selenate and methylseleninic acid accounted for 20.7% and 0.28%, respectively. The data suggested that a substantial fraction of unidentified selenium (unknown Se) (2.94%) cannot be definitively identified by current selenium speciation methodology. The addition of hydrogen peroxide ($H_2O_2$), potassium permanganate ($KMnO_4$), hypochlorite ($OCl^-$), and persulfate ($S_2O_8^{2-}$) was used to determine the effectiveness of oxidants to transform the unidentified selenium species to simpler, currently-identifiable selenium species, such as selenate or selenite, for efficient removal by zero-valent iron systems and methods (e.g., hZVI). The original pH of FGD wastewater was 7.54 and the final pH ranged from 7.03 to 7.77 after adding different oxidants (Table 1). No pH adjustment was made during the test.

Selenium speciation results (FIG. 2) showed that methaneseleninic acid (MeSe) concentration was increased by all oxidants tested because MeSe is readily synthesized by oxidation. No other obvious change was found by the addition of hydrogen peroxide suggesting that hydrogen peroxide cannot improve total selenium removal. When persulfate was used as oxidant, selenite decreased from 76% to 69.2%, while selenate increased from 20.7% to 27.3%, which indicated that persulfate can oxidize selenite to selenate (see FIG. 2). Selenocyanate ($SeCN^-$) was slightly increased upon persulfate oxidation. Oxidation by potassium permanganate and hypochlorite decreased selenite from 76% to 0.09% and 0.12%, respectively, and increased selenate from 20.7% to 96.7% and 96.1%, respectively. Among the tested oxidants, only potassium permanganate (50 mg/L) was effective in reducing unidentified selenium from 52.6 to 35.0 ppb.

1720 µg/L to 51 µg/L in the first 12 h, and then to 4.66 µg/L (total selenium) (greater than 99.7% removal) at 24 h. Zero-valent iron (e.g., hZVI) methods are effective for treating common identifiable selenium compounds in FGD wastewater. Therefore, the residual selenium (4.66 ppb) after treatment was likely the unidentified selenium species (such a result meets the selenium discharge limit of 10 ppb planned by the US EPA). In a control batch hZVI test treating the same FGD wastewater but without permanganate pretreatment, total selenium was reduced to about 50 ppb after 24 h reaction and thereafter the residual selenium remained steady after 48 h treatment.

As noted above, unidentified selenium in FGD wastewater decreased markedly when pretreated with 50 mg/L $KMnO_4$ (Table 1). By increasing the permanganate concentration, it is believed that additional quantities of unidentified selenium can be broken down to other reactive selenium species that can be effectively removed by zero-valent iron (e.g., hZVI) systems.

The results demonstrate that most unidentified selenium in FGD wastewater can be removed by the hZVI system after pretreatment with permanganate.

CSTR Test for FGD Wastewater

A two-stage continuously stirred-tank reactor (CSTR) test was conducted to evaluate the effectiveness of a zero-valent iron (i.e., hZVI) system with oxidative pretreatment for selenium removal from FGD wastewater. See Example 3 and FIG. 1.

Selenium results for FGD wastewater CSTR tests are summarized in Table 2. Table 2 summarizes total selenium quantitation and speciation in FGD wastewater after pretreatment with FGD wastewater after pretreatment with 50 ppm $KMnO_4$ in a representative constant stirred reactor (CSTR) test.

TABLE 2

Total selenium quantitation and speciation in the FGD wastewater after pretreatment with 50 ppm $KMnO_4$ in the CSTR test.

| | Samples | pH | $Fe^{2+}$ ppm | Se speciation analyses (IC-ICP-CRC-MS) | | | | | | | | | |
|---|---|---|---|---|---|---|---|---|---|---|---|---|---|
| | | | | Se(IV) | Se(VI) | $SeCN^-$ | MeSe(IV) | SeMe | $SeSO_3^{2-}$ | Unknown Se Species (n) | Total Se | Total Se (by ICP-DRC-MS) | Missing Se |
| Raw FGD | | 7.52 | | 1330 | 357 | $ND^2$ | 9.38 | $ND^3$ | $ND^3$ | 66.3 (1) | 1762.7 | 2050 | 287.3 |
| Pretreated with $KMnO_4$, 1 h | | 7.47 | | 1.8 | 1670 | $ND^2$ | 22.2 | $ND^3$ | $ND^3$ | 35 (1) | 1729.0 | 2020 | 291.0 |
| HRT = 6 h | R1 at t = 18 h | 8.61 | 0 | $ND^1$ | 87.9 | $ND^2$ | 2.57 | $ND^3$ | $ND^3$ | 2.14 (1) | 92.61 | 116 | 23.39 |
| | R2 at t = 18 h | 8.80 | 0 | $ND^1$ | 6.26 | $ND^2$ | 1.17 | $ND^3$ | $ND^3$ | 0 | 7.43 | 9.5 | 2.07 |
| | R1 at t = 24 h | 8.58 | 0 | $ND^1$ | 68.8 | $ND^2$ | 2.42 | $ND^3$ | $ND^3$ | 2.17 (1) | 73.39 | 87.3 | 13.91 |
| | R2 at t = 24 h | 8.81 | 0 | $ND^1$ | 5.29 | $ND^2$ | 0.91 | $ND^3$ | $ND^3$ | 0 | 6.20 | 8.0 | 1.80 |
| HRT = 4 h | R1 at t = 16 h | 8.47 | 1.14 | $ND^1$ | 123 | $ND^2$ | 2.57 | $ND^3$ | $ND^3$ | 5.31 (1) | 130.9 | 167 | 36.12 |
| | R2 at t = 16 h | 8.68 | 0.615 | $ND^1$ | 13.1 | $ND^2$ | 0.84 | $ND^3$ | $ND^3$ | 0 | 13.94 | 22.7 | 8.76 |
| | R1 at t = 20 h | 8.50 | 0.915 | $ND^1$ | 118 | $ND^2$ | 3.07 | $ND^3$ | $ND^3$ | 5.16 (1) | 126.2 | 139 | 12.77 |
| | R2 at t = 20 h | 8.73 | 0.48 | $ND^1$ | 11.6 | $ND^2$ | 0.74 | $ND^3$ | $ND^3$ | 0 | 12.34 | 18.7 | 6.36 |

All results reflect the applied dilution and are reported in µg/L.
$ND^1$ = Not detected at the applied dilution) <0.74).
$ND^2$ = Not detected at the applied dilution (<0.16).
$ND^3$ = Not detected at the applied dilution (<0.49).
$SeCN^-$ = Selenocyanate; MeSe(IV) = Methylseleninic acid; SeMe = Selenomethionine; $SeSO_3^{2-}$ = Selenosulfate.
Unknown Se Species = Total concentration of all unknown Se species observed by IC-ICP-MS.
n = number of unknown Se species observed.

Batch Test for FGD Wastewater

A batch test was conducted to evaluate the effectiveness of a zero-valent iron (i.e., hZVI) system with oxidative pretreatment for selenium removal from FGD wastewater. See Example 2.

Figure 3:
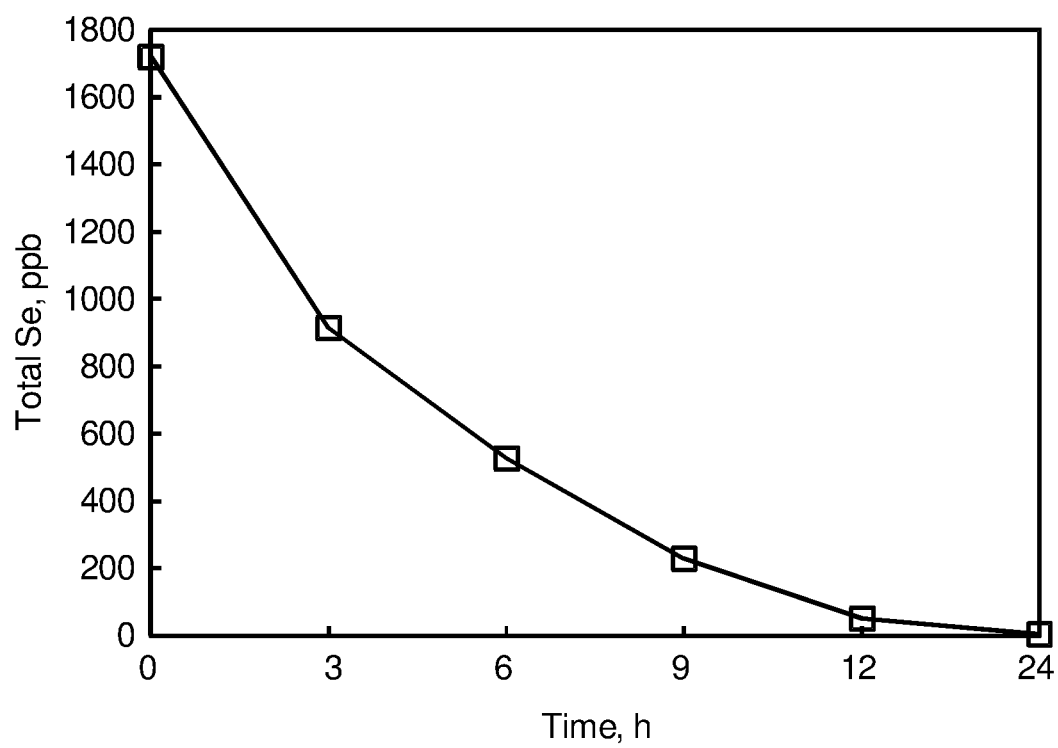
FIG. 3 illustrates total selenium concentration (ppb) in FGD wastewater as a function of reaction time during a representative batch test.

A batch hZVI test was conducted in a 6 L reactor with FGD wastewater pretreated with 100 mg/L $KMnO_4$. As shown in FIG. 3, total selenium was rapidly decreased from The total selenium concentration after pretreatment was about 1729 and 2020 ppb by IC-ICP-CRC-MS and ICP-DRC-MS methods, respectively. The missing selenium after pretreatment represents about 14.4% of total Se, which was calculated by the differences of total selenium detected by the two methods. The consistent discrepancy of the two methods indicated that there were certain selenium species in the sample that might have been filtered out by the IC column and escaped detection by IC-ICP-CRC-MS. Here total selenium was analyzed on the basis of ICP-DRC-MS method.

As shown in Table 2, 50 mg/L KMnO$_4$ reduced the concentration of unidentified selenium (unknown Se) from 66.3 to 35.0 ppb. With the addition of permanganate, selenite was decreased from 64.88% to negligible (0.09%) and selenate increased accordingly from 17.41% to 82.67%, indicating that selenite was completely oxidized to selenate by permanganate. Methaneseleninic acid (MeSe) was increased from 9.38 to 22.2 ppb.

Figure 4:
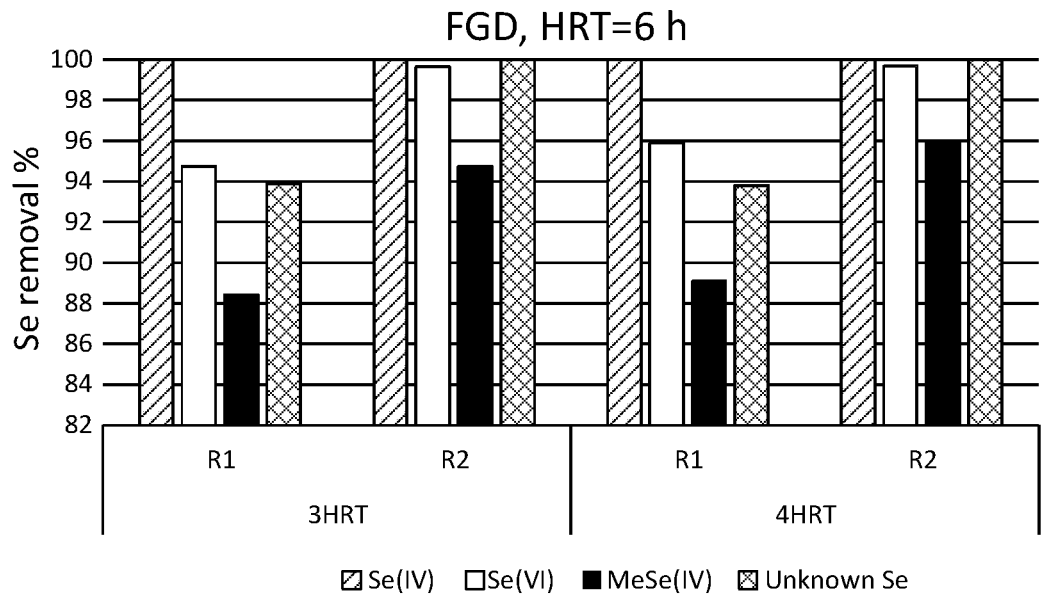
FIG. 4 compares selenium removal (Se removal, %) for FGD wastewater in a representative treatment method (continuous-flow stirred-tank reactor test) of the invention: two-stages with a hydraulic residence time (HRT) of 6 h.
Figure 5:
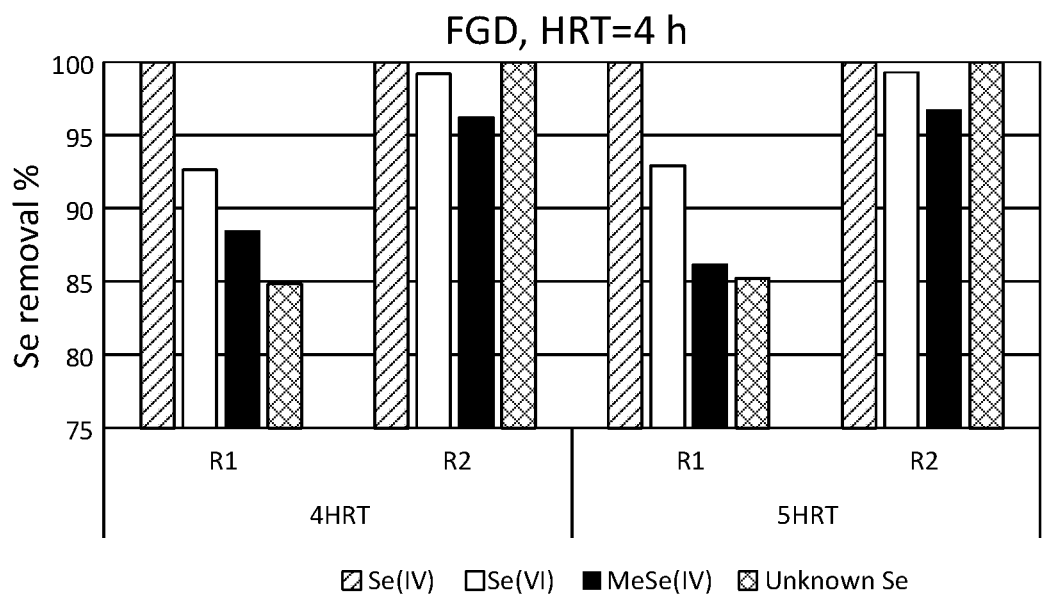
FIG. 5 compares selenium removal (Se removal, %) for FGD wastewater in a representative treatment method (continuous-flow stirred-tank reactor test) of the invention: two-stages with a total hydraulic residence time (HRT) of 4 h.

After pretreatment with 50 mg/L KMnO$_4$ (as Mn) for 1 h, two stage of CSTR test was conducted to evaluate selenium removal by hZVI. At HRT=6 h, total selenium concentration measured by ICP-DRC-MS in the first stage (R1) after 18 h (three HRT time passed) was reduced from 2020 to 116 ppb (Table 2). Meanwhile, all selenite and 93.89% unidentified selenium was removed in R1 and all unidentified selenium was removed by the second stage (R2), as shown in FIG. 4. Total selenium in R2 was only 9.5 ppb (Table 2), which was composed of 6.26 ppb Se (VI), 1.17 ppb MeSe (IV), and 2.07 ppb missing Se from calculation. Total selenium in R1 and R2 after four HRTs was 87.3 and 8.0 ppb, respectively, which represented 99.6% of removal efficiency after the two-stage process. When HRT was adjusted to 4 h, total selenium in R1 and R2 after four HRTs was 167 and 22.7 ppb, respectively (Table 2). All selenite was removed in R1 and all unidentified selenium was removed in R2 (FIG. 5), which was similar to the results at HRT of 6 h. Total selenium in R1 and R2 after five HRTs was 139 and 18.7 ppb, respectively. In addition, R1 showed lower pH than that of R2, because acidic Fe$^{2+}$ stock solution (pH 2.4) was added into R1.

Zero-valent iron (e.g., hZVI) systems are known to decrease selenium in FGD wastewater from over 2000 ppb to around 50 ppb in a four-stage process with an HRT of 17 h. In this test, the removal efficiency was significantly improved after pretreatment with permanganate (e.g., 50 mg/L KMnO$_4$). It is possible that the further unidentified selenium can be converted to another treatable unidentified selenium species that can be effectively removed by a zero-valent iron (e.g., hZVI) system, despite the remaining unidentified selenium concentration as high as 35.0 ug/L.

The results demonstrate that the hZVI system (two-stage) was effective for treating selenium compounds in FGD wastewater after pretreatment with permanganate. In these tests, more than 30 mg/L KMnO$_4$ was left in the pretreated FGD wastewater feed indicating that 20 mg/L KMnO$_4$ can be sufficient for certain FGD wastewaters. While single-stage processes with pretreatment can meet the restrictive selenium discharge limits planned by the US EPA, two- or three-stage processes with pretreatment can meet these limits with shorter reaction times.

The following examples are provided for the purpose of illustrating, not limiting, the invention.

EXAMPLES

Materials and Methods

Materials.
All chemicals used were of analytical reagent grade. All reagent solutions were prepared with deoxygenated deionized (DDI) water (E-pure, Barnstead, USA). NaNO$_3$ (>99%, Alfa Aesar) and FeCl$_2$·4H$_2$O (J. T. Baker) were used for zero-valent iron preconditioning. The zero-valent iron (Fe$^0$ or ZVI) powder (5 µm) was purchased from a commercial ZVI vendor and the purity was about 98% according to the vendor. 20 mM Fe$^{2+}$ added with 4 mM HCl was prepared as Fe$^{2+}$ stock solution (pH about 2.4). Potassium permanganate (KMnO$_4$) J. T. Baker; hydrogen peroxide (30%) BDH; hypochlorite (5% w/v NaClO solution) J. T. Baker; persulfate (10% w/v solution of Na$_2$S$_2$O$_9$) Aqua Solutions.

Raw flue-gas-desulfurization (FGD) wastewater was obtained from one of the power facilities of Southern Company, Inc., Plant Barry, Bucks, Ala. The raw FGD wastewater was known to contain high concentrations of unidentified selenium species of about 200-700 mg/L (out of total selenium of about 1000-2000 mg/L) that cannot be effectively removed by various treatment methods including both biological treatment and chemical treatment processes conducted by Southern Company, Inc. The concentration of unidentified selenium species in the FGD wastewater decreased to below 100 ppb pretesting, perhaps due to decomposition of unidentified selenium species during the long storage time (about 5 months).

hZVI System Preconditioning Method.
A nitrate-Fe$^{2+}$ pretreatment method was used to convert a pure ZVI system into the hybrid ZVI (hZVI) system (also referred to herein as an activated iron system or a hybrid ZVI+Fe$_3$O$_4$ system) as described in Huang, Y. H.; Zhang, T. C.; Shea, P. J.; Comfort, S. D., Effects of Oxide Coating and Selected Cations on Nitrate Reduction by Iron Metal. *Journal Of Environmental Quality* 2003, 32, (4), 1306-1315; and Huang, Y. H.; Tang, C.; Zeng, H., Removing molybdate from water using a hybridized zero-valent iron/magnetite/Fe(II) treatment system. *Chemical Engineering Journal* 2012, 200-202, (0), 257-263, each expressly incorporated herein by reference in its entirety. For the batch test in 6 L reactor and continuous-flow test in 2 L reactor, 14.3 mM NaNO$_3$ (200 mg/L as N), and 10 mM FeCl$_2$ were added into the reactor containing with 50 g/L ZVI. The reactors were mixed with overhead electric stirrer overnight to allow ZVI/Fe(II)-nitrate reaction. The nitrate is reduced by ZVI with magnetite as the iron corrosion product following the Eq. (1):

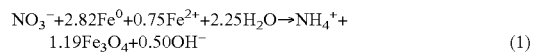

$$NO_3^- + 2.82Fe^0 + 0.75Fe^{2+} + 2.25H_2O \rightarrow NH_4^+ + 1.19Fe_3O_4 + 0.50OH^- \quad (1)$$

Upon preconditioning about 5% of the initial ZVI was consumed resulting in a magnetite concentration of about 5 g/L in the reactor. Unless otherwise stated, tests were conducted with 5 µm ZVI or 325 mesh ZVI.

Sampling and Analysis Methods
Sampling kits were purchased from VWR (0.45 µm filter discs, 60 mL syringes, 60 mL plastic vials. Borosilicate glass bottles (40 mL) for selenium sampling were purchased from Applied Speciation and Consulting, LLC (ASC) Bothell, Wash. For each test, two sets of samples were collected and filtered through 0.45 µm filters. No acid was added at the site of collection. One set of collected water samples were reserved at <4° C. in a cooler filled with ice and sent to ASC for selenium speciation and quantitation within 24 hours. The second set of samples was analyzed at Texas A&M University.

The samples for selenium speciation were analyzed by ion chromatography inductively coupled plasma collision reaction cell mass spectrometry (IC-ICP-CRC-MS). The samples for total selenium quantitation were analyzed by inductively coupled plasma dynamic reaction cell mass spectrometry (ICP-DRC-MS).

Example 1

FGD Wastewater Oxidation

In this example, FGD wastewater was treated with a select oxidant and the treated FGD wastewaters were analyzed for selenium speciation.

To evaluate the effect of chemical methods on unidentified selenium species decomposition, 50 mg/L of a select oxidant (hydrogen peroxide ($H_2O_2$), potassium permanganate ($KMnO_4$), hypochlorite ($OCl^-$), and persulfate ($S_2O_8^{2-}$)) was added separately into plastic vials containing 60 mL raw FGD wastewater. Samples were taken and filtered after 2 h to evaluate the ability of these oxidants to breakdown unidentified selenium species and transform these species to currently identifiable selenium species. Selenium speciation was analyzed for these samples. The results are shown in FIG. 2 and summarized in Table 1.

Example 2

FGD Wastewater Treatment: Batch Tests

In this example, FGD wastewater treatment batch tests using an oxidation pretreatment step are described.

Batch tests were conducted to evaluate the effectiveness of a zero-valent iron (hZVI) system for removal of unidentified selenium species from FGD wastewater. The effectiveness of selenium removal was determined as a function of reaction time in 6 L reactor. Raw FGD wastewater was added into the reactor containing freshly-prepared activated iron media (preconditioned hZVI prepared as described above). After stirring overnight, the media was allowed to settle to the bottom of the reactor and the treated supernatant was removed. The treatment of fresh media with a dose of FGD wastewater was aimed to eliminate any potential bias by the fresh activated iron media on selenium removal.

Subsequently, pretreated FGD wastewater that was subject to treatment with 100 mg/L $KMnO_4$—Mn for 1 h was added into the reactor and mixed with the activated iron media. Samples were taken at 0, 3, 6, 9, 12 and 24 h for total selenium quantitation.

The results are shown summarized in FIG. 3.

Example 3

FGD Wastewater Treatment: Continuous Stirred-Tank Reactor Tests

In this example, continuous stirred-tank reactor (CSTR) FGD wastewater treatment tests using an oxidation pretreatment step are described.

CSTR tests were conducted to evaluate the effectiveness of a zero-valent iron (hZVI) system for removal of unidentified selenium species from FGD wastewater. The effectiveness of selenium removal was determined as a function of reaction time using a two-stage CSTR experimental setup, which consisted of two reactors in series, each with a volume of 2 L (see FIG. 1). $Fe^{2+}$ stock solution was continuously added in stage one (R1) to maintain $Fe^{2+}$ in the influent at a concentration of 1.0 mM.

FGD wastewater was pretreated with 50 mg/L $KMnO_4$ for 1 h, and then was continuously flowed into the two-stage CSTR treatment system. Tests were conducted at a hydraulic retention time (HRT) of 6 h and then 4 h. Samples from FGD wastewater were taken to analyze for pH, $Fe^{2+}$, selenium speciation, and total selenium quantitation.

The results are shown in FIGS. 4 (HRT=6 h) and 5 (HRT=4 h) and summarized in Table 2.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for reducing the concentration of selenium species in a water, comprising:
    treating a water comprising one or more selenium species that are not reducible by treatment with zero-valent iron, with permanganate in a first vessel that does not include zero-valent iron to convert the one or more selenium species that are not reducible by treatment with zero-valent iron to one or more selenium species that are reducible by treatment with zero-valent iron; and
    transferring the one or more selenium species that are reducible by treatment with zero-valent iron to a second vessel; and
    contacting the one or more selenium species that are reducible by treatment with zero-valent iron with a zero-valent iron treatment system in a second vessel, wherein the zero-valent iron treatment system comprises (a) a reactive solid comprising zero-valent iron and one or more iron oxide minerals in contact therewith and (b) ferrous iron, whereby the concentration of the one or more selenium species that are not reducible by treatment with zero-valent iron in the water is decreased.

2. The method of claim 1, wherein the concentration of permanganate is from about 5 to about 100 mg/L.

3. The method of claim 1, wherein the permanganate is potassium permanganate.

4. The method of claim 1, wherein the one or more selenium species that are not reducible by treatment with zero-valent iron are selected from the group consisting of selenite ($Se^{4+}$), and selenide ($Se^{-2}$) species, and mixtures thereof.

5. The method of claim 1, wherein the one or more selenium species that are not reducible by treatment with zero-valent iron are selected from the group consisting of selenite, selenocyanate, selenomethionine, and methylselenic acid.

6. The method of claim 1, wherein the the reduction in the concentration of selenium species is measured by a decrease in total selenium.

7. The method of claim 1, wherein the concentration of permanganate in the first vessel is maintained at about 1 to about 100 mg/L.

8. The method of claim 1, wherein contacting the one or more selenium species that are not reducible by treatment with zero-valent iron with a zero-valent iron treatment system occurs in a first reactor.

9. The method of claim 8, wherein the first reactor is a packed bed or a fluidized bed.

10. The method of claim 8, wherein the ferrous iron is continuously introduced to the first reactor.

11. The method of claim 1, wherein the water further comprises a contaminant selected from arsenic, aluminum, antimony, beryllium, cobalt, lead, cadmium, chromium, silver, zinc, nickel, molybdenum, thallium, vanadium, and ions and oxyanions thereof; borates, nitrates, bromates, iodates, and periodates; trichloroethylene; dissolved silica; and mixtures thereof.

12. The method of claim 1, wherein the water further comprises an oxyanion, a chlorinated organic compound, or mixtures thereof.

13. The method of claim 1, wherein the water is selected from flue gas desulfurization wastewater, industrial waste stream, oil refinery waste, tail water of a mining operation, stripped sour water, surface water, ground water, and an influent stream.

14. The method of claim 1, wherein the water is flue gas desulfurization wastewater.

15. The method of claim 1, wherein the one or more iron oxide minerals of the reactive solid comprise magnetite.

16. The method of claim 1, wherein the reactive solid comprises a plurality of particles.

17. The method of claim 1, wherein the method does not include introducing air or oxygen (aeration) to the water containing the selenium species either in the permanganate treatment step or the zero-valent iron treatment step.

18. In a method for reducing the concentration of selenium species in a water comprising one or more selenium species that are not reducible by treatment with zero-valent iron involving contacting the water with a zero-valent iron treatment system comprising (a) a reactive solid comprising zero-valent iron and one or more iron oxide minerals in contact therewith and (b) ferrous iron, the improvement comprising treating the water comprising one or more selenium species that are not reducible by treatment with zero-valent iron with permanganate in a first vessel prior to contacting the water comprising one or more selenium species that are reducible by treatment with zero-valent iron produced in the first vessel with the zero-valent iron treatment system in a second vessel.

19. A system for reducing the concentration of one or more selenium species in water, comprising:
- a first vessel for receiving water comprising one or more selenium species that are not reducible by treatment with zero-valent iron, wherein the first vessel comprises aqueous permanganate and does not comprise zero-valent iron; and
- a first reactor in fluid communication with the first vessel for receiving permanganate-treated water from the first vessel, wherein the first reactor comprises a zero-valent iron treatment system comprising (a) a reactive solid comprising zero-valent iron and one or more iron oxide minerals in contact therewith and (b) ferrous iron.

* * * * *